United States Patent
Cheung et al.

(10) Patent No.: US 6,491,887 B1
(45) Date of Patent: Dec. 10, 2002

(54) SUPPORTED SULFUR COMPOSITIONS AND THE PREPARATION AND USE THEREOF

(75) Inventors: Tin-Tack Peter Cheung, Bartlesville, OK (US); Donald H. Kubicek, Bartlesville, OK (US); David E. Legg, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/593,071

(22) Filed: Jun. 13, 2000

(51) Int. Cl.⁷ .................. B01D 53/14; B01D 53/72; B01D 20/00
(52) U.S. Cl. ............ 423/245.1; 502/400; 502/407; 502/415; 502/417; 502/423; 585/820
(58) Field of Search ............... 423/245.1, 210; 502/400, 407, 415, 417, 423; 585/820

(56) References Cited

U.S. PATENT DOCUMENTS

| | | | |
|---|---|---|---|
| 5,024,683 A | 6/1991 | Tooley et al. | 55/74 |
| 5,085,844 A | 2/1992 | Nowack et al. | 423/245 |
| 5,096,681 A | 3/1992 | Cheung | 423/245 |
| 5,360,779 A | 11/1994 | Cheung et al. | 502/415 |
| 5,639,707 A * | 6/1997 | Lewis et al. | 502/423 |

* cited by examiner

*Primary Examiner*—Stanley S. Silverman
*Assistant Examiner*—Maribel Medina
(74) *Attorney, Agent, or Firm*—Jeffrey R. Anderson

(57) ABSTRACT

A solid combination of elemental sulfur and an inorganic support material prepared in an inert atmosphere to provide a composition for absorbing trialkyl arsines. The composition prepared thereby and the method for absorbing trialkyl arsines using the composition.

24 Claims, No Drawings

SUPPORTED SULFUR COMPOSITIONS AND THE PREPARATION AND USE THEREOF

BACKGROUND OF THE INVENTION

Supported sulfur compositions, such as alumina which has been impregnated with liquid elemental sulfur, are effective trialkyl arsine sorbents. These materials and their use as trialkyl arsine sorbents have been described in U.S. Pat. Nos. 5,085,844 and 5,360,779. The present invention is directed to an improved method of making supported sulfur compositions which exhibit enhanced trialkyl arsine sorption capacity.

SUMMARY OF THE INVENTION

It is an object of this invention to provide an improved process for preparing supported sulfur compositions which are effective as trialkyl arsine sorbents. It is a further object of this invention to provide supported sulfur compositions made by the process of this invention and a method for absorbing trialkyl arsine using the supported sulfur compositions of this invention. Particular objects and advantages of this invention will become apparent from the detailed description and the appended claims.

In a process for preparing a supported elemental sulfur composition, the improvement comprises contacting molten elemental sulfur and an inorganic support material in an inert atmosphere thereby preventing the formation of sulfur oxides which are ineffective as absorbents for trialkyl arsines.

Preferably, the inorganic support material is alumina. It is presently preferred to employ a solid combination consisting essentially of elemental sulfur and inorganic support material that has been prepared by impregnating the inorganic support material (preferably alumina) with molten elemental sulfur at a temperature above the melting point of elemental sulfur in an inert atmosphere, and then lowering the temperature below the melting point of elemental sulfur while retaining the composition in an inert atmosphere so as to afford solidification of the elemental sulfur on the inorganic support material.

DETAILED DESCRIPTION OF THE INVENTION

Any suitable, effective inorganic support material can be employed as the support (carrier) component of the solid combination of elemental sulfur and an inorganic support material which is the final product of this invention. Preferably, the support material is selected from the group consisting of alumina, fluorided alumina (i.e., alumina which has been treated with HF or $NH_4HF_2$ under conditions as to incorporate fluoride ions into the crystal lattice of alumina), aluminum phosphate, magnesia (MgO), silica, titania ($TiO_2$), zirconia ($ZrO_2$), hafnia ($HfO_2$), zinc oxide, zinc aluminate ($ZnAl_2O_4$), aluminates of alkaline earth metals (i.e., of Be, Mg, Ca, Sr, Ba), zinc titanate ($Zn_2TiO_4$), titanates of alkaline earth metals, activated carbon, and mixtures of two or more than two of the above materials. Presently more preferred support materials are alumina, silica, titania, activated carbon, zeolites and mixtures of two or more of these materials. Particularly preferred is alumina.

The elemental sulfur component is combined with the inorganic support material by impregnating the support material with molten sulfur, followed by cooling below the melting temperature of sulfur with the processes of impregnating and cooling below the melting temperature of sulfur carried out in an inert atmosphere. Generally the elemental sulfur will be contacted with the inorganic support and the temperature then raised above the melting point of elemental sulfur to impregnate the inorganic support. The temperature is then decreased so that the sulfur solidifies on the inorganic support while the inert atmosphere is maintained thereby providing solid sulfur on an inorganic support.

Generally, the sulfur content in the supported composition is in the range of from about 1 to about 50, preferably from about 3 to about 25, weight-% elemental S. It is within the scope of this invention to have, in addition to elemental sulfur, metal oxides and/or metal-sulfur compounds (such as Fe(III) oxide and/or sulfite and/or sulfate or the corresponding compounds of Co and/or Ni and/or Mn) present in the supported composition.

The supported elemental sulfur composition produced by this invention can have any suitable surface area (preferably about 10–1000 $m^2/g$, as measured by the B.E.T. method employing $N_2$), any suitable shape (such as spherical, cylindrical, ring-shaped, trilobal, etc.), and any suitable particle size (such as about 0.2–20 mm diameter of spherical particles).

This invention yields improved results in the removal of trialkyl arsines from fluid streams that contain trialkyl arsines as compared to using supported sulfur compositions made in every way by the same process except for carrying out the impregnation of the support with molten sulfur under an inert atmosphere.

The term "trialkyl arsine", as used herein, refers to compounds having the general formula of $R_3As$, wherein each R is a radical independently selected from among alkyl groups (straight or branched), preferably having a 1–6, more preferably 1–3, carbon atoms. Particularly preferred trialkyl arsines are trimethyl arsine, triethyl arsine, dimethyl ethyl arsine and diethyl methyl arsine.

Any suitable liquid or gaseous fluid stream which contains trialkyl arsine can be used as feed in the process of this invention. Preferably, the feed is gaseous. Non-limiting examples of suitable feeds are: natural gas, gaseous petroleum fractions comprising paraffins and olefins containing 1–6 carbon atoms per molecule and gaseous products from thermal and catalytic cracking of petroleum, shale oil or coal. Generally the gases comprise methane, ethane, ethylene, propane, propylene, n-butane, isobutane, butenes and the like. These gas streams can contain other impurities, such as hydrogen sulfide, carbonyl sulfide (COS), mercaptans, organic sulfides, carbon monoxide, carbon dioxide, inert gases ($N_2$, He, Ne, Ar), and the like. The process of this invention is effective even when $H_2S$ is present.

Other arsenic compounds may also be present in the fluid stream which is treated by the process of this invention, such as $AsH_3$, $RAsH_2$, $R_2AsH$, $R_3AsO$ (trialkyl arsine oxides), $R_3AsS$ (trialkyl arsine sulfides) and the like; wherein R is an alkyl group, as defined above. It is also possible to have triphenyl arsine, dialkyl phenyl arsines, dialkyl cycloalkyl arsines and the like present in the feed. Preferably free oxygen is substantially absent from the feed.

Generally, the total concentration of the trialkyl arsines in the preferably gaseous feed is in the range of from about 1 ppb (1 part by weight of trialkyl arsenic per billion parts by weight of feed) to about 0.1 percent arsenic. The concentration of other impurities and the exact composition of the feedstock will vary widely from feedstock to feedstock.

Any suitable contacting conditions can be employed in the sorption process of this invention. Generally, the temperature in the contacting zone is in the range of from about −20 to about 50° C. Generally, the pressure in the contacting zone is in the range from about 1 to about 500 atm., preferably about 1 to about 70 atm. Generally, the hourly space velocity of the gaseous feed in the contacting zone is in the range from about 10 to about 20,000volume of feed/volume of sorbent/hour, preferably from about 1,000 to about 10,000volume/volume/hour, measured at about 25° C.,/1 atm. Generally, the contacting is continued until trialkyl arsine breakthrough occurs, i.e., when the treated product contains more trialkyl arsines than can be tolerated, such as an amount of about 50 ppb.

Treatment of the feed stream in accordance with the process of this invention can be carried out in any suitable manner. In one embodiment of the invention, a bed of the sorbent is placed in a fixed bed in a confined zone and a fluid stream, preferably a gas, is passed therethrough in either upward or downward flow. Other less preferred methods of treatment include a fluidized operation in which the feed and the sorbent particles are maintained in a state of turbulence under hindered settling conditions in a confined zone, moving bed operations in which the sorbent passes as moving bed countercurrently to or cocurrently with the feed. In a fixed bed operation of a continuous process the flow of fluid can be rotated between two or more sorbent beds with at least on bed in sorbent operation with another in regeneration mode. Continuous processes are preferred, but it is understood that batch operation is also possible.

The following examples are provided to further illustrate this invention. The examples are not to be construed as unduly limiting the scope of this invention.

EXAMPLE I

This example illustrates the preparation of sulfur/alumina sorbent compositions by the process of this invention.

Sorbent A (Invention) An amount of 103.2 grams of Fisher Chemical, 80–200 mesh alumina was dried overnight at 450° F., cooled to 200° F. and weighed. The dried material which weighed 101.3 grams was mixed with 12 grams of freshly ground sulfur. This mixture was placed in an oven at 315° F., under a nitrogen atmosphere, for 2 hours. The sulfur melted and dispersed on the alumina. The mixture was gently agitated 3 times during the 2 hour period. The product was cooled under a nitrogen atmosphere to produce a composition of solid sulfur on alumina. The cooled composition, comprising about 9 percent sulfur on alumina, was bottled.

Sorbent B (Comparison) An amount of 388 pounds of 5×8 S-201 alumina was dried overnight at 400° F. About 194 pounds of the dried material was transferred to a steam heated, ribbon blender. The material was allowed to cool to 315° F. at which time in a period of about 10 minutes, with the blender running, 21.7 pounds of sulfur was spread through a sieve over the hot alumina. The blender was then stopped and the material was allowed to heat soak for 2 hours at 315° F. with the blender switched on for about 20 seconds every 15 minutes in both forward and reverse. The same procedure was repeated by transferring the remaining 194 pounds of dried alumina into the blender with the already treated material. The material, comprising about 10 percent sulfur on alumina, was unloaded into 5 gallon metal buckets, allowed to cool overnight and packaged in fiber packs.

EXAMPLE II

This example illustrates the use of the sorbent of this invention and a sorbent prepared without the use of an inert atmosphere (comparison) in absorption of trimethyl arsine ($Me_3As$). The test procedure entailed bubbling a nitrogen flow through liquid $Me_3As$ enclosed in a container surrounded by a mixture of acetone and solid $CO_2$ and passing the gaseous effluent through a ½ inch outside diameter tube which was packed with a bed of sorbent with quartz wool at each end and stoppered at each end. The effluent from the sorbent bed was bubbled through a closed container of concentrated NaOH solution with the effluent from the NaOH solution bubbled through a closed container of 10–4 M $KMnO_4$ solution with the effluent from this first $KMnO_4$ container bubbled through a second $KMnO_4$ container. The effluent from the second $KMnO_4$ container was vented through a wet test meter.

Run A: (Invention) An amount of about 9 cc of ⅛ inch sphere, sorbent A was packed into the ½ inch diameter tube. Nitrogen flow was set at 194 cc/hr through the test apparatus. Breakthrough of $Me_3As$, exhibited by color change in both $KMnO_4$ solutions, occurred after passing 202 liters of nitrogen through the system. It was calculated that 3.9 gm arsenic/100 gm sorbent had been absorbed. Analysis by ICP-MS (iron coupled plasma mass spectroscopy) set the absorbed amount at 3.6 gm arsenic/100 gm absorbent.

Run B: (Comparison) An amount of about 8 cc of ⅛ inch sphere, sorbent B was packed into the ½ inch diameter tube. Nitrogen flow was set at 194 cc/hr through the test apparatus. Breakthrough of $Me_3As$, exhibited by color change in both $KMnO_4$ solutions, occurred after passing 126 liters of nitrogen through the system. It was calculated that 2.1 gm arsenic/100 gm sorbent had been absorbed. Analysis by ICP-MS set the absorbed amount at 2.4 gm arsenic/100 gm absorbent.

TABLE I

| Run | Sorbent | Arsenic Absorbed (Calculated) | Arsenic Absorbed (ICP-MS Analysis) |
| --- | --- | --- | --- |
| A (Invention) | A | 3.9 gm/100 gm sorbent | 3.6 gm/100 gm sorbent |
| B (Comparison) | B | 2.1 gm/100 gm sorbent | 2.4 gm/100 gm sorbent |

It is apparent from the data in Table I above that the sorbent of the invention prepared under an inert atmosphere, surprisingly, is superior in absorbing trialkyl arsine as compared to sorbent prepared in the same manner with the exception of being prepared without the inert atmosphere.

Reasonable variation, modifications and adaptations for various conditions and reactants can be made within the scope of the disclosure and the appended claims without departing from the scope of this invention.

That which is claimed is:

1. A process for preparing a supported elemental sulfur composition suitable as an absorbent for alkyl arsines which method comprises, in an inert atmosphere, contacting molten elemental sulfur and an inorganic support material to provide a composition of sulfur on an inorganic support and subsequently, in an inert atmosphere, cooling the composition below the melting point of sulfur thereby providing a supported elemental sulfur composition suitable as an absorbent for alkyl arsines.

2. A process in accordance with claim 1, wherein said inorganic support material is selected from the group consisting of alumina, fluorided alumina, aluminum phosphate, magnesia, silica, titania, zirconia, hafnia, zinc oxide, zinc aluminate, aluminates of alkaline earth metals, zinc titanate, titanates of alkaline earth metals, activated carbon, zeolites and mixtures thereof.

3. A process in accordance with claim 2, wherein said solid combination contains about 1 to about 50 weight-% elemental sulfur.

4. A process in accordance with claim 3, wherein said inorganic support material is alumina and the elemental sulfur content in said solid combination is about 3–25 weight-% S.

5. A process in accordance with claim 3, wherein said solid combination consists essentially of elemental sulfur and alumina.

6. A process in accordance with claim 4, wherein said solid combination consists essentially of elemental sulfur and alumina.

7. A process in accordance with claim 1, wherein said supported elemental sulfur composition is prepared by (1) mixing elemental sulfur with an inorganic support material in an inert atmosphere to provide an intimate mixture of elemental sulfur and inorganic support material, (2) raising the temperature of the intimate mixture above the melting point of elemental sulfur to provide an intimate mixture of molten sulfur and inorganic support material while maintaining the inert atmosphere and (3) subsequently, in an inert atmosphere, lowering the temperature below the melting point of elemental sulfur to provide a supported elemental sulfur.

8. A process in accordance with claim 7, wherein said inorganic support material is selected from the group consisting of alumina, fluorided alumina, aluminum phosphate, magnesia, silica, titania, zirconia, hafnia, zinc oxide, zinc aluminate, aluminates of alkaline earth metals, zinc titanate, titanates of alkaline earth metals, activated carbon, zeolites and mixtures thereof.

9. A process in accordance with claim 8, wherein said solid combination contains about 1 to about 50 weight-% elemental sulfur.

10. A process in accordance with claim 9, wherein said inorganic support material is alumina and the elemental sulfur content in said solid combination is about 3–25 weight-% S.

11. A process in accordance with claim 8, wherein said solid combination consists essentially of elemental sulfur and alumina.

12. A process in accordance with claim 9, wherein said solid combination consists essentially of elemental sulfur and alumina.

13. A method for at least partially removing trialkyl arsines from hydrocarbon-containing fluids which method comprises contacting a hydrocarbon-containing fluid which comprises at least one trialkyl arsine with a supported elemental sulfur composition which has been prepared by a method comprising, in an inert atmosphere, contacting molten elemental sulfur and an inorganic support material to provide a composition of sulfur on an inorganic support and subsequently, in an inert atmosphere, cooling the composition below the melting point of sulfur thereby providing a supported elemental sulfur composition suitable as an absorbent for alkyl arsines.

14. A process in accordance with claim 13, wherein said inorganic support material is selected from the group consisting of alumina, fluorided alumina, aluminum phosphate, magnesia, silica, titania, zirconia, hafnia, zinc oxide, zinc aluminate, aluminates of alkaline earth metals, zinc titanate, titanates of alkaline earth metals, activated carbon, zeolites and mixtures thereof.

15. A process in accordance with claim 14, wherein said solid combination contains about 1 to about 50 weight-% elemental sulfur.

16. A process in accordance with claim 15, wherein said inorganic support material is alumina and the elemental sulfur content in said solid combination is about 3–25 weight-% S.

17. A process in accordance with claim 15, wherein said solid combination consists essentially of elemental sulfur and alumina.

18. A process in accordance with claim 16, wherein said solid combination consists essentially of elemental sulfur and alumina.

19. A process in accordance with claim 13, wherein said supported elemental sulfur composition is prepared by (1) mixing elemental sulfur with an inorganic support material in an inert atmosphere to provide an intimate mixture of elemental sulfur and inorganic support material, (2) raising the temperature of the intimate mixture above the melting point of elemental sulfur to provide an intimate mixture of molten sulfur and inorganic support material while maintaining the inert atmosphere and (3) subsequently, in an inert atmosphere, lowering the temperature below the melting point of elemental sulfur to provide a supported elemental sulfur.

20. A process in accordance with claim 19, wherein said inorganic support material is selected from the group consisting of alumina, fluorided alumina, aluminum phosphate, magnesia, silica, titania, zirconia, hafnia, zinc oxide, zinc aluminate, aluminates of alkaline earth metals, zinc titanate, titanates of alkaline earth metals, activated carbon, zeolites and mixtures thereof.

21. A process in accordance with claim 20, wherein said solid combination contains about 1 to about 50 weight-% elemental sulfur.

22. A process in accordance with claim 21, wherein said inorganic support material is alumina and the elemental sulfur content in said solid combination is about 3–25 weight-% S.

23. A process in accordance with claim 21, wherein said solid combination consists essentially of elemental sulfur and alumina.

24. A process in accordance with claim 22, wherein said solid combination consists essentially of elemental sulfur and alumina.

* * * * *